US007796540B2

(12) United States Patent
Arai et al.

(10) Patent No.: US 7,796,540 B2
(45) Date of Patent: Sep. 14, 2010

(54) MESSAGE SUBSTITUTION RESPONSE SYSTEM

(75) Inventors: Daisuke Arai, Saitama (JP); Kiyohito Yoshihara, Saitama (JP); Akira Idoue, Saitama (JP); Hiroki Horiuchi, Saitama (JP)

(73) Assignee: KDDI Corporation, Tokyo (JP)

( * ) Notice: Subject to any disclaimer, the term of this patent is extended or adjusted under 35 U.S.C. 154(b) by 65 days.

(21) Appl. No.: 12/167,562

(22) Filed: Jul. 3, 2008

(65) Prior Publication Data
US 2009/0010172 A1    Jan. 8, 2009

(30) Foreign Application Priority Data
Jul. 5, 2007  (JP) .............. 2007-177743

(51) Int. Cl.
H04L 12/28    (2006.01)
(52) U.S. Cl. ...................... 370/254; 709/230
(58) Field of Classification Search ............... 370/389; 709/3, 2, 230; 703/13
See application file for complete search history.

(56) References Cited
U.S. PATENT DOCUMENTS
5,694,543 A * 12/1997 Inoue ................ 714/4

7,472,414 B2 * 12/2008 Izatt et al. .................. 726/11
2007/0208551 A1 * 9/2007 Herro ....................... 703/13
2007/0245033 A1 * 10/2007 Gavrilescu et al. ......... 709/230

FOREIGN PATENT DOCUMENTS
JP          9186716          7/1997
JP         2006285757       10/2006

* cited by examiner

Primary Examiner—Dang T Ton
Assistant Examiner—Wei Zhao
(74) Attorney, Agent, or Firm—Westman, Champlin & Kelly, P.A.

(57) ABSTRACT

In a network including equipment noncompliant to the topology management protocol, a message substitution response system executing substitution response to a message discovered or topology search message in lieu of the noncompliant equipment is provided. The substitution response module generation unit 22 generates a substitution response module which responds to Discover message and topology search message in lieu of each of LLTD noncompliant equipment for every LLTD noncompliant equipment. The network simulation module generation unit 23 generates a network simulation module for simulating message transmission on the home network. The substitution response functional unit 24 simulates message transmission between the home network and each of substitution response modules, and message transmission between each of substitution response modules by said network simulation module.

2 Claims, 3 Drawing Sheets

MESSAGE SUBSTITUTION RESPONSE SYSTEM

The present application is claims priority of Japanese Patent Application Serial No. 2007-177743, filed Jul. 5, 2007, the content of which is hereby incorporated by reference in its entirety.

BACKGROUND OF THE INVENTION

1. Field of the Invention

The present invention relates to a message substitution response system which responds, in a network including equipment noncompliant to topology management protocol, to a discovery message or a topology search message in lieu of the noncompliant equipment.

2. Description of the Related Art

With the recent promulgation of home network, such environments that every equipment in a residence is connected to the network have been becoming common. In order to utilize the network, although it is necessary to grasp equipment being connected to the network and their relation of connection (topology), this is not easy task for users without expert knowledge.

As a technology for presenting users a topology of home network, topology management technology LLTD (Link Layer Topology Discovery) developed by Microsoft Corporation is known. With LLTD, various messages are exchanged between "mapper" that collects topology information and executes topology drawing, and LLTD compliant equipment being connected to the network and are referred to as "responder".

For topology drawing, first, a mapper transmits a Discover message in the network in the form of broadcast frame. A responder which received this Discover message registers own MAC address to a Hello message and transmits it in the form of broadcast frame. As a result, each of LLTD compliant equipment on the network can now know MAC address of all the LLTD compliant equipment.

Second, a topology search message for investigating a relation of connection of the both among each of LLTD compliant equipment is transmitted and received in the form of unicast frame, and each of compliant equipment stores receiving records of the topology search message. Following this, the mapper collects receiving records of the topology search message from each responder, recognizes a network topology, and visualizes it for displaying and outputting.

As for the technology of displaying network topology, for example, Patent Documents 1 and 2 are known.

[Patent Document 1] Japanese Patent Application Laid-Open No. 2006-285757

[Patent Document 2] Japanese Patent Application Laid-Open No. 09-186716

In order to draw topology utilizing LLTD and existing network topology management technology, all the equipment on the network should be in compliance with a specific topology management protocol. However, to effect all the network equipment located in the residence to be in compliance with the specific topology management protocol is difficult from viewpoints of resource and costs of the equipment.

SUMMARY OF THE INVENTION

An object of the present invention is to present a message substitution response system which responds, in a network including equipment noncompliant to the topology management protocol, to a discovery message or a topology search message in lieu of the noncompliant equipment.

The present invention is specific in that equipment which manages the network topology monitors messages to be transmitted based on a predetermined topology management protocol and that the following procedures are provided in the message substitution response system in which substitution response is made to the message in lieu of the equipment noncompliant to the topology management protocol.

(1) It includes a means for receiving a discovery message for discovering equipment on a network, a means for receiving a topology search message to be transmitted to the equipment discovered, a noncompliant equipment identification means for identifying equipment noncompliant to topology management protocol, a noncompliant equipment management means for managing address information containing MAC address of the noncompliant equipment, a topology information management means for managing topology information of the network, a substituting response module generation means for generating a substitution response module which executes substitution response to the message received in lieu of the noncompliant equipment for every noncompliant equipment, a network simulation module generation means for generating a network simulation module which simulates message transmission on the network based on the network topology, and a substitution response means for simulating message transmission between the network and each of substitution response modules by the network simulation module.

(2) An address camouflage means for assigning camouflage MAC address different from MAC address of the noncompliant equipment to which the substitution response module executes substitution response is provided to each of substitution response module, each of the substitution response module returns a response message of the camouflaged MAC address for a message discovered, and the substitution response means causes the substitution response module to which is assigned the MAC address to execute substitution response to topology search message addressed to the camouflaged MAC address.

According to the present invention, the following advantages are accomplished:

(1) Even a case where equipment noncompliant to the topology management protocol such as LLTD are connected to the network, the noncompliant equipment will be drawn to topology which the mapper displays.

(2) Since camouflage MAC address different from each of noncompliant equipment is assigned to the substitution response module simulating each of noncompliant equipment so that each of substitution response module responds to the discovery message with camouflage MAC address, the topology search message using MAC address as destination address is transmitted to the substitution response module of each of noncompliant equipment, while messages other than the topology search message could be transmitted to each of noncompliant equipment.

DETAILED DESCRIPTION OF THE PREFERRED EMBODIMENTS

Figure 1:
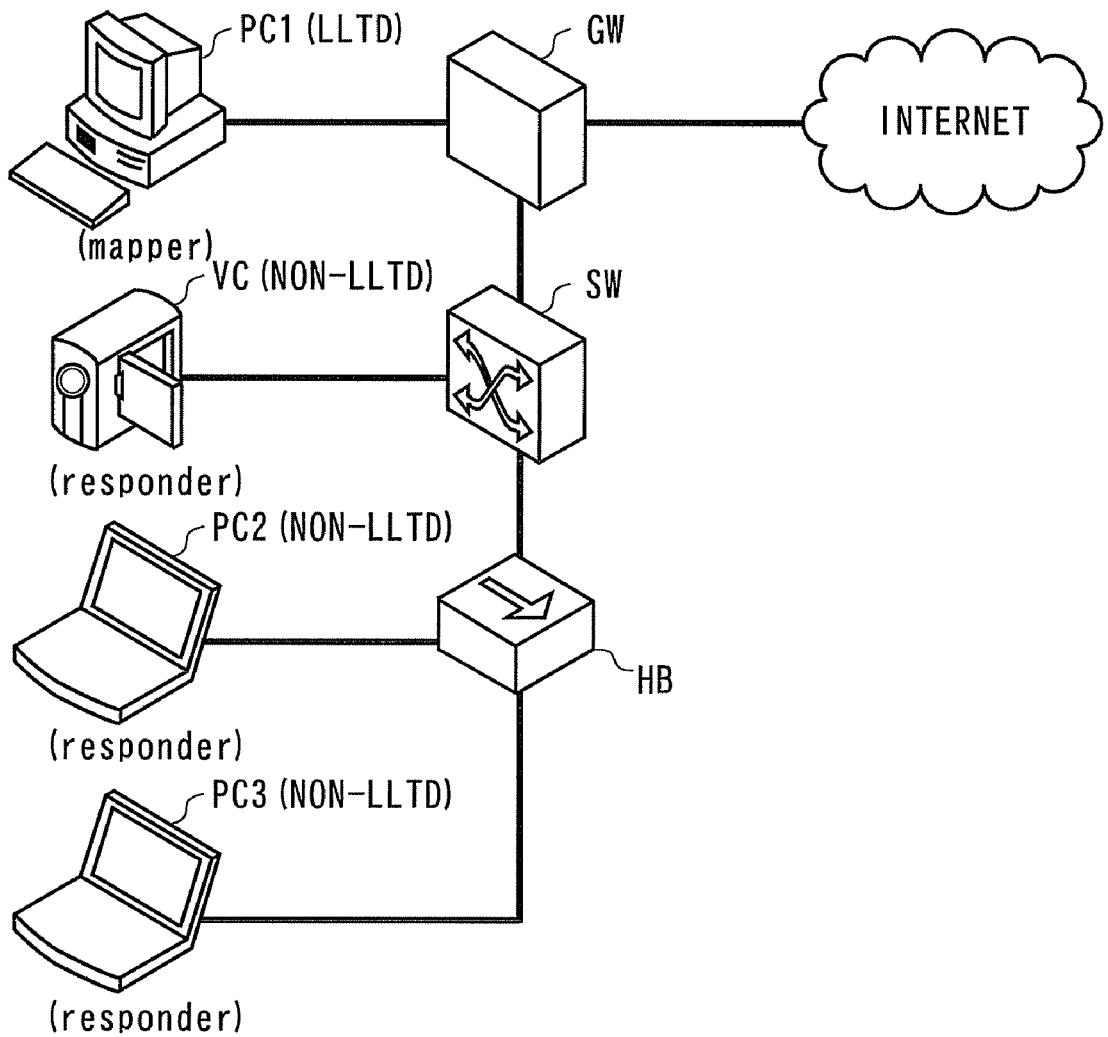
FIG. 1 is a drawing showing composition of home network to which the present invention is applied.

FIG. 1 is a drawing showing composition of home network to which the present invention is applied where LLTD compliant network equipment and LLTD noncompliant network equipment are connected to Internet via the gateway (GW).

An LLTD compliant computer (PC1) is connected directly to GW which is equipped with substitution response function specific to the present invention. Therefore, the GW is capable of receiving all of the messages transmitted and received by the PC1. To the GW, LLTD noncompliant video camera (VC) is further connected via a switch (SW). To the SW are further connected LLTD noncompliant computers (PC2, PC3) via a hub (HB).

According to the present embodiment, LLTD compliant PC1 being directly connected to the GW actuates as the mapper, and VC, and PC2 and PC3 actuate as the responder, PC1 collects topology information from each of equipment by LLTD function and draws a topology of the home network. Meanwhile, when LLTD compliant computer and video camera are connected as the responder, they are directly connected to the GW.

Figure 2:
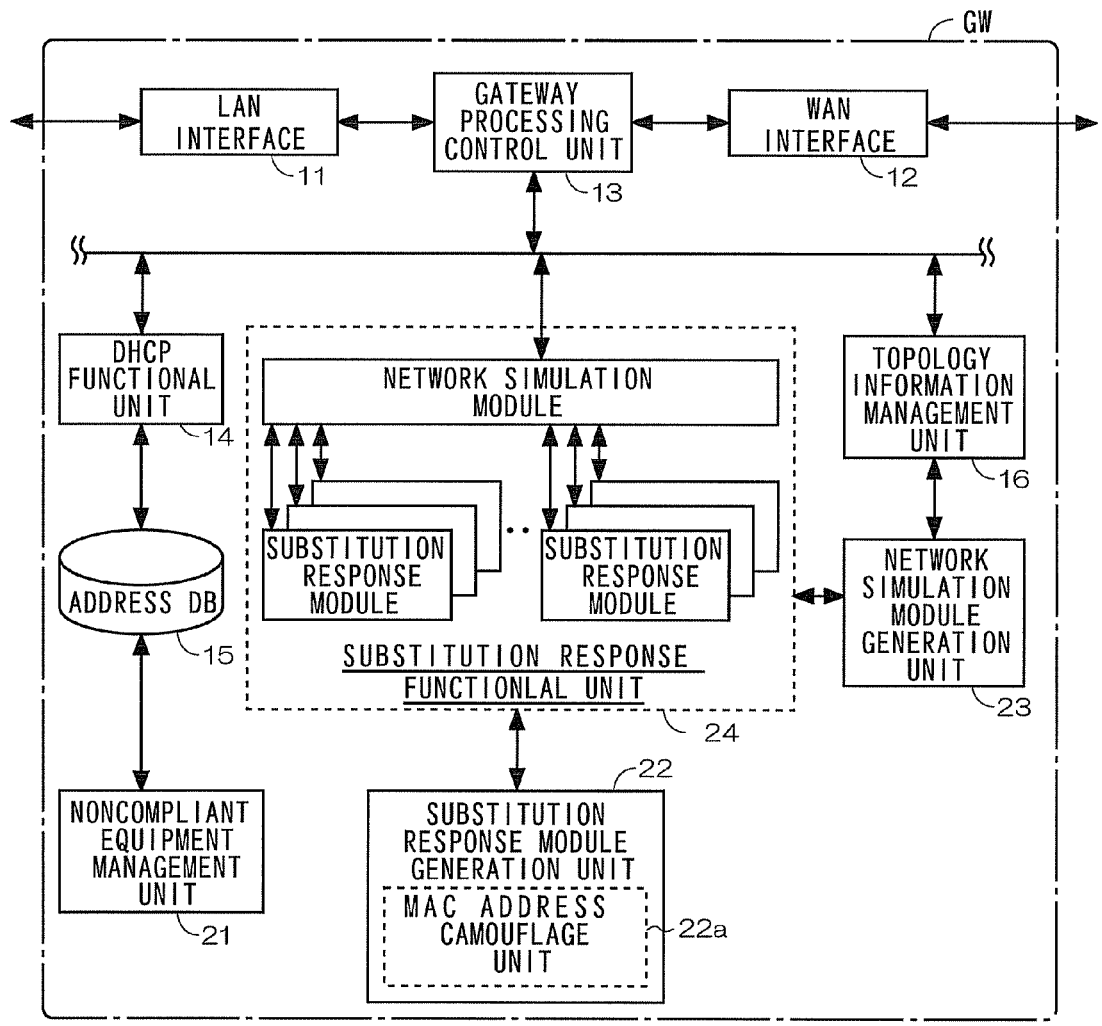
FIG. 2 is a functional block diagram showing composition of primary component of gateway GW.

FIG. 2 is a functional block diagram showing composition of primary component of the GW where basic composition of the gateway, i.e., LAN interface 11, WAN interface 12, gateway processing control unit 13, DHCP (Dynamic Host Configuration Protocol) functional unit 14, and address database (DB) 15 are shown. The present invention is specific in that it further includes a topology information management unit 16, a noncompliant equipment management unit 21 which will be dealt with later in detail, a substitution response module generation unit 22, a network simulation module generation unit 23, and a substitution response functional unit 24.

In the composition as mentioned above, from each of the equipment such as PC and VC being connected first to the home network, IP address assignment request, in which own MAC address is registered, is transmitted to the GW. The DHCP functional unit 14 of the GW assigns fresh IP address to each of equipment in response to the IP address assignment request and at the same time, registers a pair of assigned IP address and each equipment MAC address to the DB 15 and manages it.

The topology information management unit 16 collects information about connected equipment from SW on the network according to known topology management protocol utilizing SNMP (Simple Network Management Protocol) and manages them as the topology information.

The noncompliant equipment management unit 21 acquires each equipment address information being registered in the DB 15 and at the same time, destroys address information of the LLTD compliant equipment (PC1), and manages address information of the LLTD noncompliant equipment (PC2, PC3, VC). Identification of the LLTD noncompliant equipment can be performed based on, for example, presence or absence of response (Hello message) from each of equipment for Discover message being transmitted on the home network. This Discover message may be transmitted by the GW itself or transmitted from the PC1 that functions as the mapper.

The substitution response module generation unit 22 generates a substitution response module that responses while behaving as if an LLTD compliant equipment for every LLTD noncompliant equipment in lieu of each of LLTD noncompliant equipment for Discover message being transmitted from the mapper and topology search message. This substitution response module generation unit 22 includes a MAC address camouflage unit 22a and fresh camouflage MAC address different from MAC address of the LLTD noncompliant equipment, in which the substitution response module executes substitution response, is assigned to each of substitution response modules.

The network simulation module generation unit 23 generates a network simulation module for simulating message transmission on the home network based on the topology information being managed by the topology information management unit 16. The substitution response functional unit 24 simulates message transmission between the home network and each of substitution response modules, and message transmission between substitution response modules by the network simulation module.

Figure 3:
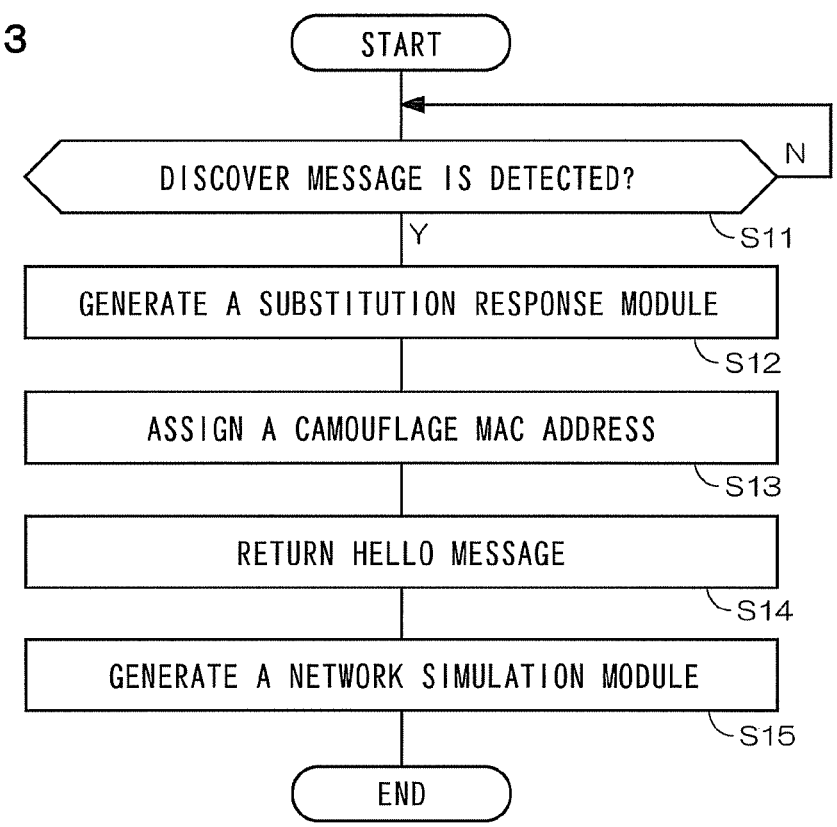
FIG. 3 is a flowchart showing procedures of substitution response for Discover message being transmitted from the mapper.

FIG. 3 is a flowchart showing procedures of substitution response by the GW in lieu of each of LLTD noncompliant equipment for the Discover message being transmitted by the mapper for the sake of discovery of equipment on the network.

When the Discover message is detected in step S11, address information of each of noncompliant equipment is read out in step S12 from the noncompliant equipment management unit 21 by the substitution response module generation unit 22, and a substitution response module is generated for every noncompliant equipment. In step S13, fresh camouflage MAC address different from MAC address of the LLTD noncompliant equipment, in which the substitution response module executes substitution response, is assigned to each of substitution response modules by MAC address camouflage unit 22a of the substitution response module generation unit 22.

In step S14, each of substitution response modules returns Hello message in which the camouflage MAC address is used as own MAC address. In step S15, topology information of each of noncompliant equipment is read out from the topology information management unit 16 by the network simulation module generation unit 23, thereby generating a network simulation module. In this network simulation module, connection state of switches and hubs composing the network is being simulated.

Following this, from the mapper (PC1) which received the Hello message from each of equipment is transmitted a topology search message addressed to each of equipment in the form of unicast frame. Since the destination address of this topology search message is camouflage MAC address being registered to each Hello message received from each of substitution response modules, any message addressed to the noncompliant equipment will be received by the substitution response module camouflaging each of noncompliant equipment.

According to the present invention, since each of substitution response modules is designed to respond to the Discover message by Hello message with camouflage MAC address, the topology search message using MAC address as the destination address is transmitted to the substitution response module of each of noncompliant equipment, while messages other than the topology search message could be transmitted to each of noncompliant equipment.

Figure 4:
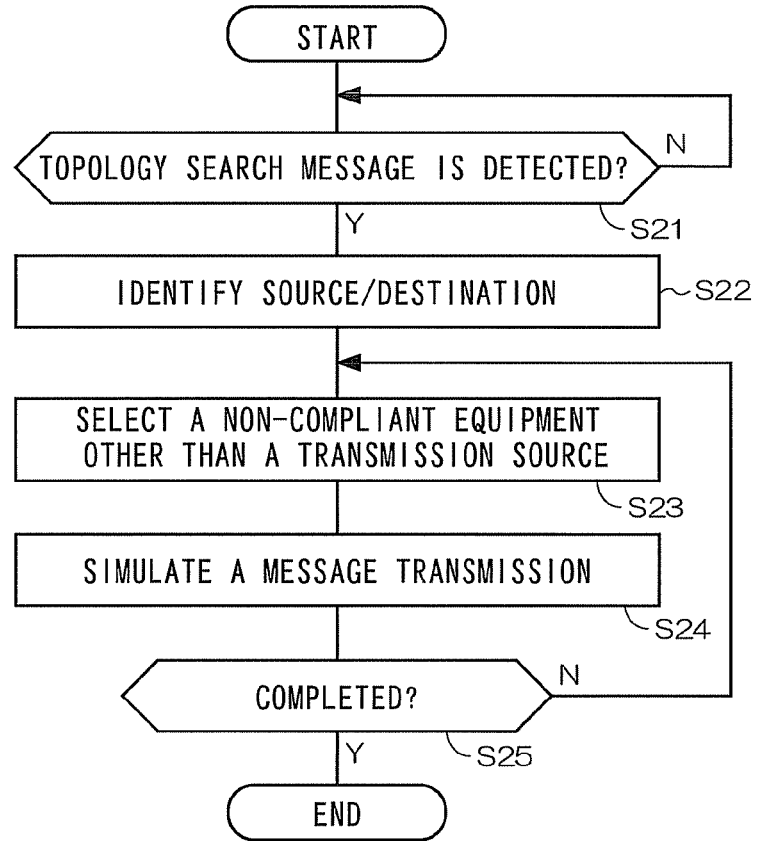
FIG. 4 is a flowchart showing procedures of substitution response for topology search message being transmitted from the mapper.

FIG. 4 is a flowchart showing procedures where the substitution response functional unit 24 of the GW executes substitution response to the search message in lieu of the noncompliant equipment.

In step S21, when entry of topology search message from the network or substitution response module is detected, transmission source address and destination address of this search message are identified in step S22. In step S23, one noncompliant equipment other than the transmission source is selected as the equipment to be addressed this time.

In step S24, the network simulation module simulates message transmission of the search message between each of substitution response modules, or message transmission between the home network and each of substitution response modules, using transmission source address and destination address of the search message, and MAC address of the equipment to be addressed as parameters.

Now referring to composition of the network shown in FIG. 1, operations of the network simulation module will be explained. Compliant equipment PC1 serves as transmission source of the search message, destination is substitution response module simulating noncompliant equipment PC3, and PC2 serves as the equipment to be addressed this time. Then in the network simulation module, the search message being transmitted from PC1 reaches till HB via SW, and HB transmits the search message to both PC2 and PC3, and therefore, this search message is transmitted not only to destination PC3, but also to addressed equipment PC2. Accordingly, the search message is input to each of substitution response modules simulating noncompliant addressed equipment PC2 and noncompliant equipment PC3, and their receiving records are stored.

In the meantime, if PC1 serves as transmission source of the search message, destination is substitution response module simulating noncompliant equipment VC, and PC2 serves as the equipment to be addressed this time, the search message being transmitted from PC1 is relayed by SW only to VC side, and not relayed to HB side, and therefore, this search message is not transmitted to the addressed equipment PC2. Namely, the search message is destroyed without being input to the substitution response module simulating the addressed equipment PC2, and therefore, receiving records of the message are not left in the substitution response module simulating the addressed equipment PC2.

Further, when noncompliant equipment VC serves as transmission source of the search message, destination is noncompliant equipment PC3, and addressed equipment is PC2 as is the case where the mapper (PC1) instructs the substitution response module simulating VC to transmit the search message to the substitution response module simulating PC3, the search message being transmitted from VC reaches till HB via SW, and HB transmits the search message to both PC2 and PC3, and therefore this search message is transmitted not only to PC3, but also to addressed equipment PC2. Accordingly, the search message is input to each of substitution response modules simulating PC2 and PC3, and their receiving records are stored.

In step S25, whether or not each of above-mentioned processing is executed for all the network equipment is judged, and if not completed yet, it returns to step S23 and each of above-mentioned processing is repeated while addressed equipment is shifted.

After that, when the mapper (PC1) transmits receiving record request message to each equipment with appropriate timing, LLTD compliant equipment returns own receiving records in response to the message. For LLTD noncompliant equipment, in GW, each of substitution response modules of the substitution response functional unit 24 returns own receiving records to the mapper in response to the message. The mapper then completes network topology based on the receiving records returned from each of LLTD compliant equipment and each of substitution response modules as each of LLTD noncompliant equipment, and displays and outputs it.

What is claimed is:

1. A message substitution response system for monitoring a message being transmitted by equipment managing network topology based on a predetermined topology management protocol, and responding to said message in lieu of equipment noncompliant to said topology management protocol, said system comprising:

a means for receiving a broadcasted discovery message for discovering equipment on the network;

a means for receiving a topology search message being transmitted to equipment discovered;

a noncompliant equipment identification means for identifying equipment noncompliant to the topology management protocol from a plurality of equipment which is connected to the network;

a noncompliant equipment management means for managing address information including MAC address of the noncompliant equipment which have been identified;

a topology information management means for managing topology information of the network;

a substitution response module generation means for generating a substitution response module, which executes substitution response to the message received in lieu of the noncompliant equipment, for every noncompliant equipment;

an address camouflage means for assigning to each of said substitution response modules camouflaged MAC address different from MAC address of noncompliant equipment to which the substitution response module executes substitution response;

a network simulation module generation means for generating a network simulation module simulating message transmission on the network based on the network topology; wherein each of the substitution response module returns a response message of the camouflaged MAC address for the message discovered in lieu of the noncompliant equipment;

said network simulation module identifies a source address and destination address of topology search message transferred to equipment which respond to the discovery message, then simulating message transmission between the network and each of substitution response modules, and between the each of substitution response modules;

each of the substitution response module stores receiving records of the simulated topology search message; and a substitution response means for simulating message transmission between the network and each of substitution response modules by said network simulation module.

2. The message substitution response system according to claim 1 further equipped with gateway function and being directly connected to equipment for managing the network topology and equipment compliant to the topology management protocol.

* * * * *